United States Patent [19]
Eckhart

[11] 3,735,864
[45] May 29, 1973

[54] TEMPERATURE PROBE COT PACKAGE

[75] Inventor: Edgar O. Eckhart, Livingston, N.J.

[73] Assignee: Becton, Dickinson & Company, East Rutherford, N.J.

[22] Filed: Sept. 27, 1971

[21] Appl. No.: 184,129

[52] U.S. Cl. ................206/56 AC, 206/16.5, 206/79
[51] Int. Cl. .............................................B65d 73/00
[58] Field of Search..................206/56 AC, 56 R, 206/16.5, 79, 78 R; 217/26

[56] References Cited

UNITED STATES PATENTS

| | | |
|---|---|---|
| 2,139,150 | 12/1938 | Curtis et al...........................206/80 |
| 3,044,606 | 7/1962 | Frosh..............................206/79 UX |
| 3,494,322 | 2/1970 | Dubbels.......................206/56 AC X |
| 2,589,735 | 3/1952 | Salfisberg...........................206/56 R |
| 3,469,685 | 9/1969 | Baerman.........................206/16.5 X |
| 3,650,153 | 3/1972 | Schwab..........................206/16.5 X |

*Primary Examiner*—Leonard Summer
*Attorney*—David S. Kane, Daniel H. Kane, Philip T. Dalsimer et al.

[57] ABSTRACT

An improved package for holding a plurality of electronic thermometer cots or the like in position for simplified removal is provided. The package includes a flat, two-ply sheet formed of relatively rigid cardboard stock. A plurality of holes extend through the sheet with the openings through the top ply being slightly larger than the corresponding openings through the bottom ply.

4 Claims, 7 Drawing Figures

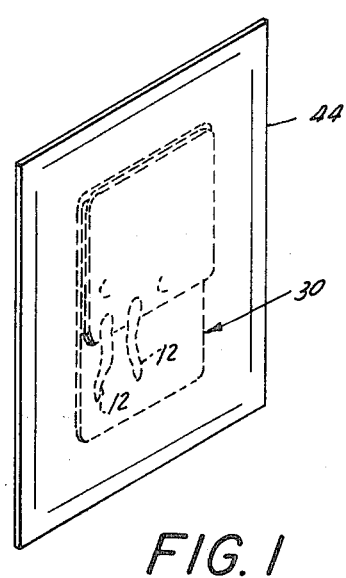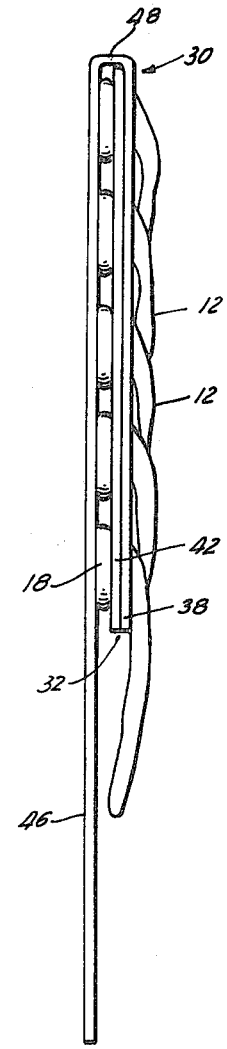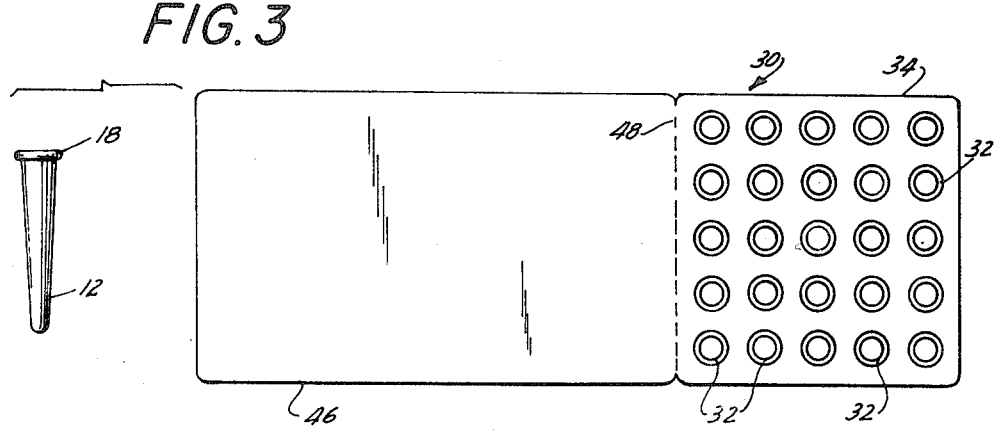
FIG. 1
FIG. 2
FIG. 3
INVENTOR
EDGAR O. ECKHART

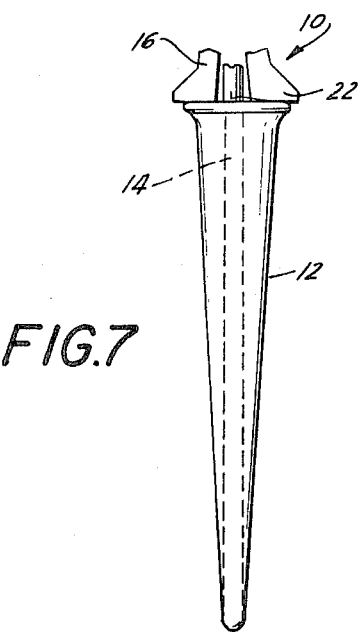
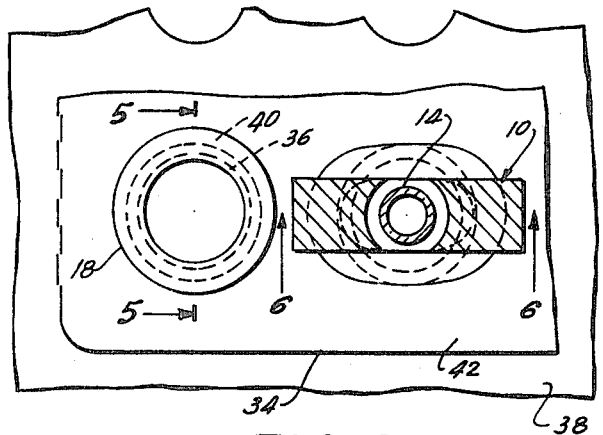
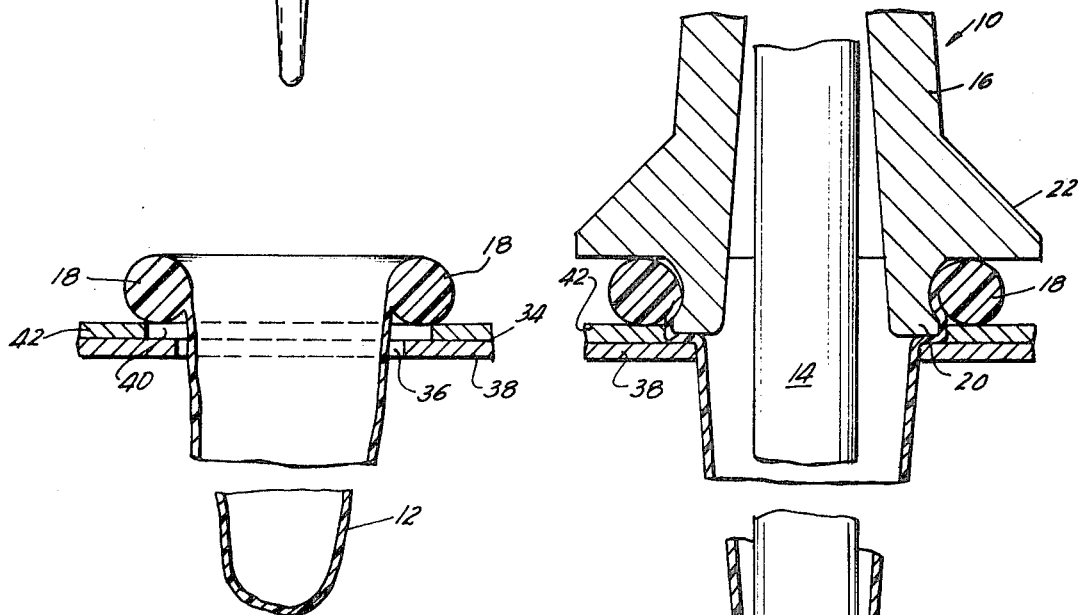
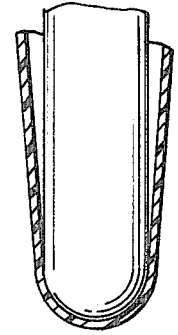

TEMPERATURE PROBE COT PACKAGE

BACKGROUND OF THE INVENTION

In U. S. Pat. application Ser. No. 35,006, filed on May 6, 1970, which is presently pending and commonly assigned herewith there is disclosed an improved electronic, medical thermometer. That thermometer is designed to receive and retain a disposable latex cot or sheath over its sensing element during temperature measurements to prevent contamination from spreading between patients during subsequent temperature measurements.

The temperature probe disclosed in the above referenced patent application is provided with a resilient, outwardly biased portion spaced rearwardly of the sensing element which serves to engage the inner surface of an associated cot while the cot is stretched over the sensing element to retain the cot in position about the sensing element. After use, the outwardly biased portion of the probe is squeezed inwardly thereby enabling the cot to eject by virtue of its natural resiliency.

The principal object of the present invention is to provide a package for containing a plurality of such cots in position to facilitate the mounting of each cot on a probe.

A further object is to provide such a package which maintains the cots in a sanitary condition prior to mounting.

SUMMARY OF THE INVENTION

The above and other beneficial objects and advantages are attained in accordance with the present invention by providing a package for receiving a plurality of cots, each having an elongated tubular body portion with a closed bottom end and open top end and an enlarged ring disposed about the top end. The package comprises a flat sheet having a plurality of cot-receiving holes therein, the diameter of each said hole measured at the top surface of the sheet being greater than the diameter of the corresponding hole measured at the bottom surface of the sheet and both the top and bottom surface hole diameters being less than the diameter measured to the outer edge of the cot ring and greater than the diameter of the cot body portion.

BRIEF DESCRIPTION OF THE DRAWINGS

In the associated drawings:

FIG. 1 is a perspective view of a cot package in accordance with the present invention;

FIG. 2 is a side elevational view of the cot package of the present invention;

FIG. 3 is a top plan view of the cot package of the present invention shown in conjunction with an associated cot;

FIG. 4 is a fragmentary top plan view of the cot package of the present invention shown with an associated temperature probe in position to remove a cot from the package;

FIG. 5 is an elevational sectional view taken along reference line 5—5 of FIG. 4;

FIG. 6 is a sectional view similar to FIG. 5 taken along reference line 6—6 of FIG. 4 and showing the associated temperature probe in position for cot removal; and, FIG. 7 is an elevational view showing a cot in operative position about an associated probe.

DETAILED DESCRIPTION OF THE PREFERRED EMBODIMENT

Reference will now be made to the associated drawings wherein similar components bear the same reference numeral throughout the several views. Referring briefly to FIG. 7, a temperature probe 10 of the type disclosed in U. S. Pat. application Ser. no. 35,006is shown with a latex cot 12 disposed about the sensing element 14 of the electronic thermometer. The electronic thermometer 10 includes an outwardly biased resilient portion 16 which is designed to engage an enlarged ring 18 of the cot to thereby secure the cot in position about the sensing element during use. To this end, as shown in FIG. 6, the resilient portion 16 of the probe handle is provided with a recess defined between flanges 20 and 22 to engage the enlarged ring 18 of the cot.

The subject matter of the present application is package 30 which is designed to hold a plurality of cots 12 and maintain them in a sanitary condition in position to facilitate removal by an associated thermometer 10. To this end, the package 30 comprises a sheet of relatively rigid cardboard stock having a plurality of openings 32 therein. The diameter of each opening 32 is sufficiently large to permit the tubular body portion of cot 12 to pass therethrough but small enough to block the passage of the enlarged ring 18 of the cot. In this connection, and as seen most clearly in FIGS. 5 and 6, package 30 comprises a two-ply cardboard sheet 34. The diameter of each hole 36 passing through the bottom ply 38 is less than the diameter of the portion 40 of hole 32 passing through the top ply 42. It should be noted, however, that the diameters of both portions 36 and 40 are less than the outer diameter of cot ring 18 so that the cot ring is prevented from passing through hole 32.

As shown in FIG. 6, this stepped-hole arrangement facilitates the removal of cots from the package by permitting the lower flange 20 of resilient member 16 to ride under the enlarged ring 18 of cot 12. This minimizes binding of the cots and the probe resilient portion on the package when a cot is secured to a probe and removed.

The present package 30 and associated cots 12 are prepacked and furnished in a sanitary condition to the hospital or laboratory where they are to be used. To maintain the sanitary condition of the cots and to facilitate the removal of the package 30 from envelope 44, package 30 is provided with a closure flap 46. Flap 46 comprises an extension of package 30 separated from the package by a perforated score line 48. The cot package 30 is supplied in envelope 44 with flap 46 folded over the top surface of package 30 as shown in FIG. 2. This prevents contamination of the interior of the cots and, at the same time, prevents the cots from falling off package 30 during removal of the package from envelope 44. As shown in FIG. 2, flap 46, in fact, comprises an extension of bottom ply 38 only folded over top ply 42 and the cot rings 18.

As stated, a package of cots is furnished in a sealed envelope 44. The user opens the envelope and removes the cots with flap 46 folded over package 30. This prevents any of the cots from falling free of the package. The flap is then opened and separated from package 30 along perforated score line 48. Package 30 may then be placed over a well or similar opening in the electronic thermometer machine housing with the cots hanging freely into the well interior. This enables the thermometer sensing element to be placed in the interior of the cots to facilitate removal of the individual cots on a temperature probe in the manner illustrated in FIG. 6.

Thus, in accordance with the above, all the mentioned objects and advantages are effectively attained.

Having thus described the invention, what is claimed is:

1. In combination: a plurality of cots of the type having an elongated tubular body portion, a closed bottom end, an open top end, and a ring disposed about said top end; and a package comprising: a flat sheet having a plurality of cot-receiving holes therein, the diameter of each said hole measured at the top surface of said sheet being greater than the diameter of the corresponding hole measured at the bottom surface of said sheet, and both said top and bottom surface hole diameters being less than the diameter to the outer edge of said cot ring and greater than the diameter of said cot body portion.

2. The package in accordance with claim 1 wherein said sheet comprises a multi-ply laminate with each hole passing through the top ply of said laminate being greater in diameter than the corresponding hole passing through the bottom ply of said laminate.

3. The package in accordance with claim 1 wherein said flat sheet further includes a flap extending beyond said package and a score line separating said flap and said package with said flap being sufficiently large to completely overlie said package when said flap is folded on said score line over said package.

4. The invention in accordance with claim 3 wherein said score line is perforated whereby to facilitate the separation of said flap and said package.

* * * * *